United States Patent Office 3,372,194
Patented Mar. 5, 1968

3,372,194
QUATERNARY BENZYLAMMONIUM SALTS
Bent Preben Arnkjaer, Glostrup, Steen Hove Antonsen, Lyngby, and Hans Otto Andersen, Virum, Denmark, assignors to Aktieselskabet Alfred Benzon, Copenhagen, Denmark, a firm
No Drawing. Filed Feb. 16, 1966, Ser. No. 433,199
Claims priority application, Denmark, Feb. 17, 1964, 757/64
6 Claims. (Cl. 260—567.6)

ABSTRACT OF THE DISCLOSURE

Quaternary benzyl ammonium salts having pronounced preventive effect against development of gastric ulcers, of the same order of magnitude as atropine and other anticholinergic compounds which are widely used in the treatment of gastric ulcers but free from the anticholinergic effect of atropine and like compounds.

---

This invention relates to novel quaternary benzylammonium salts of the general formula:

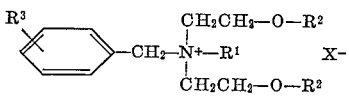

wherein $R^1$ represents a straight or branched alkyl group having 1–6 carbon atoms, or a β-alkoxyethyl group, wherein the alkyl group is straight or branched containing 1–4 carbon atoms, $R^2$ is a straight or branched alkyl group having 1–4 carbon atoms, $R^3$ is hydrogen or an alkyl group having 1–4 carbon atoms, particularly a methyl group, or a halogen atom, and X is a physiologically innocuous acid residue, and to the production of the said salts.

It has surprisingly been found that the said compounds have a pronounced preventive effect against the development of gastric ulcers. The effect, which may be determined by means of the so-called Shay-rat test, is of the same order of magnitude as is the effect of atropine and other anticholinergic compounds which are widely used in the treatment of gastric ulcers, but the compounds produced according to the present method do not have the anticholinergic effect of atropine and atropine-like compounds, so that a specific effect is obtained without any effect upon the pupil and upon the saliva and sweat secretion.

The present compounds are produced, according to the invention, by quaternizing in a manner known per se of an amine of the general formula:

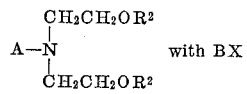

wherein A is $R^1$, if B is

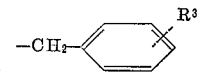

or vice versa and wherein $R^1$, $R^2$, $R^3$ and X have the above meanings.

The reaction can be carried out by direct direction of a tertiary amine, e.g. tri(methoxyethyl) amine, to a benzyl halide, e.g. benzyl iodide. The reaction can also be carried out in two steps by first producing the tertiary amine and then quaternizing the latter. Thus, the tertiary amine can be produced either by reacting a benzyl halide with a secondary alkoxyethyl amine, or an alkyl halide, or an alkoxyethyl halide is reacted with a secondary alkoxyethyl amine and the resulting tertiary amine is then quaternized. Which method to choose in the individual cases is dependent i.e. upon the availability and price of the starting materials.

The toxicity as well as the action upon the secretion and upon the acid number of the ventricle of the compounds produced according to the present method are comparable with the corresponding effects of the anticholinergic compounds hitherto used in therapy.

Physical and pharmacological properties of some of the compounds produced according to the present method are given in Table 1 below:

TABLE 1.—PHYSICAL AND PHARMACOLOGICAL DATA FOR QUATERNARY BENZYLAMMONIUM SALTS

| $R^1$ | $R^2$ | $R^3$ | X Molecular weight | Melting point, °C. | LD$_{50}$ in mg./kg. for mice ||||  Shay rats [1] |
|---|---|---|---|---|---|---|---|---|---|
| | | | | | Oral. | Subcut. | i.p. | i.v. | |
| Methoxyethyl | Methyl | H | J, 409.3 | 140–1 | | 168 | 147 | 26 | |
| Ethoxyethyl | Ethyl | H | J, 451.4 | 90–90.5 | 200–250 | 80–90 | | 28.5 | 2 |
| Propoxyethyl | Propyl | H | J, 493.5 | 102 | 144 | 70 | 75 | 40 | 2 |
| Do | do | p-CH$_3$ | Br, 460.5 | 121–2 | 125 | 73 | 45 | 25 | 1.5 |
| Do | do | m-CH$_3$ | Br, 460.5 | 117–9 | 130 | | 45 | 25–30 | |
| Do | do | o-CH$_3$ | Br, 460.5 | 94 | 100 | 73 | 45 | 25 | 1.5 |
| Do | do | p-Br | Br, 525.4 | 119 | | | | | |
| Do | do | o-Cl | J, 527.9 | 93 | 140 | 75 | 50 | 35 | |
| Iso-propoxyethyl | Isopropyl | H | Br, 446.5 | 117 | 72 | 43 | 55 | 35 | 2 |
| Butoxyethyl | Butyl | H | Br, 488.6 | 106 | 150 | 100 | 25 | 25–30 | 7.5 |
| Iso-butoxyethyl | Isobutyl | H | Br, 488.6 | 114 | 207 | 85 | 25 | 35 | 5 |
| sec. Butoxyethyl | sec. Butyl | H | Br, 488.6 | 89–90 | 103 | 80 | 25 | 30 | 5 |
| Methyl | Propyl | H | J, 421.4 | 75 | 95 | 15 | 7.5 | | |
| Propyl | do | H | Br, 402.4 | 95 | 90 | 25 | 30 | 12.5 | |
| n-Hexyl | do | H | Br, 444.5 | 114 | 180 | 50–60 | 35 | 35 | 1.5 |
| Ethoxyethyl | Butyl | H | Br, 460.5 | 107–8 | 150 | 100 | 95 | | |

[1] The effect upon Shay rats is given as the relative strength in comparison with β-(diphenyl-methoxy)-ethyl-diethyl-methyl-ammonium iodide.

The production of the compounds of the present invention is illustrated by the following examples.

Example 1

To a solution of 21.8 grams of benzyl iodide in 100 cc. of acetone, 19.1 grams of tri (β-methoxyethyl) amine are added dropwise. The solution is refluxed for 2½ hours and then stands for 2 days. The precipitated prismatic crystals are collected and dried. The crude benzyl-tri(β-methoxyethyl) ammonium iodide has the melting point 139–140.5° C. The yield is 75%.

After recrystallization from isopropanol the melting point is 140–141° C.

Example 2

23.0 grams of sodium are dissolved in 500 cc. of isobutanol by refluxing. To the resulting solution is added a solution of 48.8 grams of 2,2′,2″-trichlorotriethyl amine, HCl in 250 cc. of boiling isobutanol after which refluxing is carried out for 7 hours. The surplus of isobutanol is distilled off, and 200 cc. of water are added. The crude tri($\beta$-isobutoxyethyl) amine is extracted with toluene and isolated after which it is recovered, by fractioning in vacuum, as a fraction of B.P.$_{0.2}$110–20° C. after which it appears as a faintly yellow liquid $n_D{}^{25}$=1.4338. Yield 68%.

15.9 grams of tri($\beta$-isobutoxyethyl) amine are mixed with 9.9 grams of benzyl bromide. After standing to the next day, a crystalline mass is formed which is recrystallized from ethyl acetate. The resulting benzyl-tri-($\beta$-isobutoxyethyl) ammonium bromide is a white crystalline compound with melting point 105° C. Yield 57%.

After still another re-crystallization from ethyl acetate the melting point is 114° C.

*Example 3*

44.4 grams of $\beta$-ethoxyethyl-diethanolamine are dissolved in chloroform and reacted with 43 cc. of thionyl chloride. After distilling off of the solvent, the reaction product is crystallized from ethyl ether. The resulting 2-ethoxyethyl-2,2′-dichloro-diethylamine, HCl has the melting point 132–133° C. Yield 93%.

18.4 grams of sodium are dissolved in 400 cc. of butanol, and a solution of $\beta$-ethoxyethyl-2,2′-dichloro-diethylamine, HCl in butanol, is added. The solvent is partly distilled off in vacuum and, after cooling, water is added to dissolve all solid substance. The solution is extracted with toluene which is then distilled off. The crude product is fractionated in vacuum, and the fraction with B.P.$_{0.3\ mm.\ Hg}$ 115–120° C. is collected. The resulting $\beta$-ethoxyethyl-di($\beta$-butoxyethyl) amine is a bright liquid of low viscosity; $n_D{}^{25}$=1.4365. Yield 70%.

14.5 grams of $\beta$-ethoxyethyl-di($\beta$-butoxyethyl) amine are dissolved in 25 cc. of acetone. The solution is added dropwise to a solution of 8.55 grams of benzyl bromide in 25 cc. of acetone. After refluxing for 3 hours, the solvent is distilled off, and the product is washed with ethyl ether. The recovered benzyl-($\beta$-ethoxyethyl)-di($\beta$-butoxyethyl)-ammonium bromide has the melting point 107° C. Yield 85%.

After re-crystallization from butyl acetate, the melting point is 107–108° C.

*Example 4*

While cooling with ice, 586 grams of benzyldiethanol amine are added dropwise to 520 cc. of thionyl chloride. The mixture is refluxed for 1 hour after which 1500 cc. of isopropanol are added under steady refluxing. By cooling benzyl-2,2′-dichloro-diethylamine, HCl crystallizes and has the melting point 149–150° C. Yield 80%.

27.6 grams of sodium are dissolved in 600 cc. of propanol. While refluxing, a solution of 81.7 grams of benzyl-2,2′-dichloro-diethylamine, HCl in 400 cc. of propanol are added cautiously, after which the mixture is refluxed for 9½ hours. After distillation of 750 cc. of propanol, the remaining alcohol is replaced by 200 cc. of toluene. The mixture is cooled, and 200 cc. of water are added in which all solid substance is dissolved.

Solvent is distilled from the toluene phase until the temperature in the vessel is 135° C. The crude product is vacuum-distilled. The recovered benzyl-di($\beta$-propoxyethyl) amine has B.P.$_{0.3}$ 112–113° C., $n_D{}^{25}$=1.4830. Yield 71%.

7.5 grams of methyl iodide are dissolved in 25 cc. of acetone, and a solution of 14.0 grams of benzyl-di($\beta$-propoxyethyl) amine in 25 cc. of acetone is added. The solution is refluxed for 2 hours after which the main part of the solvent is distilled off. After addition of ethyl ether, the benzyl-methyl-di($\beta$-propoxyethyl) ammonium iodide is brought to crystallize. Yield 87%.

After two re-crystallizations from ethyl acetate, the compound in both cases shows the melting point 75° C.

We claim:
1. Quaternary benzylammonium compounds of the general formula:

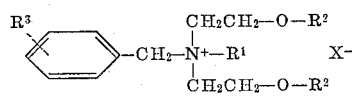

in which R$^1$ is a member of the group consisting of alkyl groups of 1 to 6 carbon atoms, and $\beta$-alkoxyethyl groups of 1 to 4 carbon atoms in the alkoxy part, R$^2$ is an alkyl group of 1 to 4 carbon atoms, R$^3$ is a member of the group consisting of hydrogen, alkyl groups of 1 to 4 carbon atoms, chlorine and bromine and X is a member of the group consisting of bromine and iodine.
2. Benzyl-tri($\beta$-propoxyethyl)ammonium iodide.
3. Benzyl-tri($\beta$-isopropoxyethyl)ammonium bromide.
4. Benzyl-tri($\beta$-butoxyethyl)ammonium bromide.
5. Benzyl-tri($\beta$-isobutoxyethyl)ammonium bromide.
6. Benzyl-tri($\beta$-sec. butoxyethyl)ammonium bromide.

References Cited

FOREIGN PATENTS 789,794   1/1958   Great Britain.

CHARLES B. PARKER, *Primary Examiner.*

R. V. HINES, *Assistant Examiner.*